W. A. WALLACE.
INSECT TRAP.
APPLICATION FILED MAR. 21, 1910.

987,841.

Patented Mar. 28, 1911.

Witnesses
W. N. Woodson
Juana M. Fallin

Inventor
W. A. Wallace

By
R. S. A. R. Lacey, Attorneys.

UNITED STATES PATENT OFFICE.

WILLIAM A. WALLACE, OF ALTUS, OKLAHOMA, ASSIGNOR OF ONE-HALF TO WILLIAM O. BRAWLEY, OF ALTUS, OKLAHOMA.

INSECT-TRAP.

987,841.  Specification of Letters Patent.  Patented Mar. 28, 1911.

Application filed March 21, 1910. Serial No. 550,608.

*To all whom it may concern:*

Be it known that I, WILLIAM A. WALLACE, citizen of the United States, residing at Altus, in the county of Jackson and State of Oklahoma, have invented certain new and useful Improvements in Insect-Traps, of which the following is a specification.

This invention has reference to an improved insect trap and has for an object to provide a device for the extermination of the insects which destroy growing crops, fruit trees, and the like, particularly the boll-weevil.

The invention comprehends a device wherein a luminous element is employed for attracting the insects against a deflector to throw the insects into a tank containing an amount of fluid to drown the insects.

The invention has for another object to so form the deflector that it reflects the rays from the luminous element outwardly about the trap to attract insects at a considerable distance therefrom. In connection with this object the invention contemplates the provision of means where acetylene gas may be burned as the luminous element, as this gas produces a light of great intensity.

For a full understanding of the invention reference is to be had to the following description and accompanying drawing, in which:—

Figure 1:
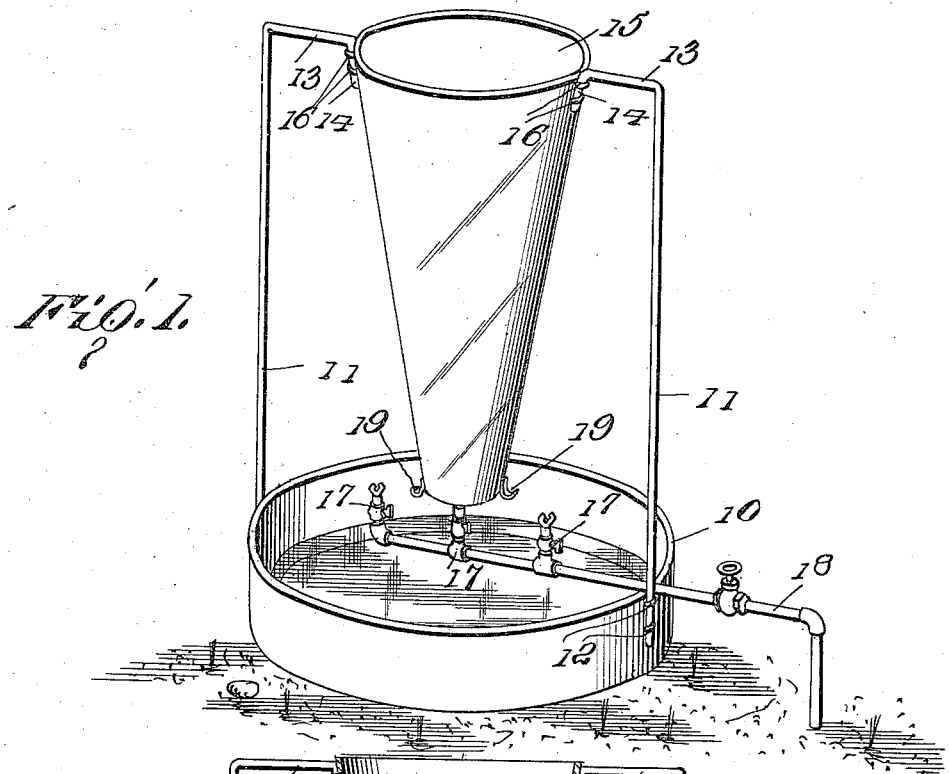
Figure 2:
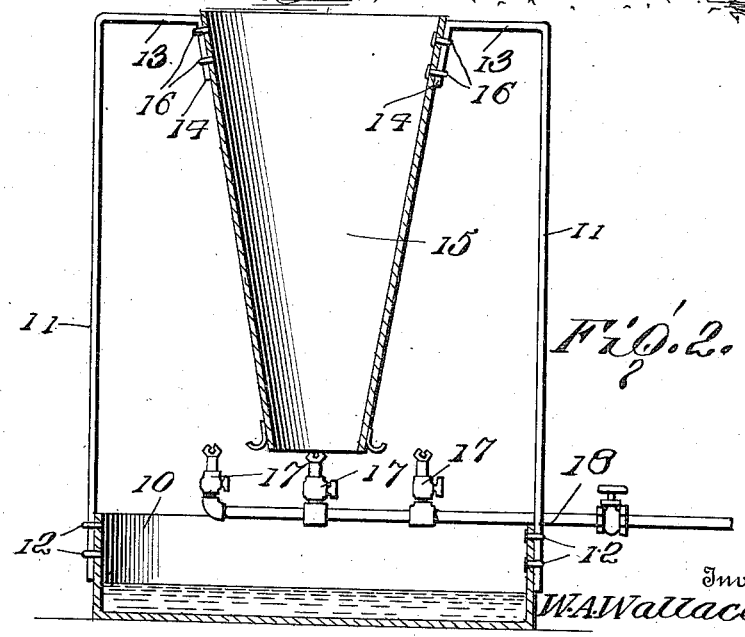

Figure 1 is a perspective view of the trap, and Fig. 2 is a sectional view through the same.

Corresponding and like parts are referred to in the following description and indicated in all the views of the accompanying drawing by the same reference characters.

Referring to the drawing the numeral 10 designates a shallow receptacle which is preferably of circular formation, as is disclosed in the drawing, and in which a quantity of water is adapted to be placed. The opposite sides of the receptacle 10 are provided with uprights 11 which are in the form of rods or heavy wire secured to the receptacle 10 through the medium of cleats 12. The uprights 11 are turned inwardly to form arms 13 which are arranged horizontally and provided at their inner ends with depending fingers 14. The fingers 14 are secured against the opposite sides of a combined reflector and deflector 15 which is arranged centrally over the receptacle 10. The fingers 14 are secured to the member 15 through the medium of cleats 16.

The combined reflector and deflector 15 comprises a frusto-conical member formed preferably from metal having a highly polished outer face and being reduced at its lower end and adjacent the receptacle 10. Suitably arranged over the receptacle 10 are the spaced burners 17 which are supported at the opposite sides of, and immediately beneath the lower end of the receptacle 15 upon a gas supply pipe 18 which is projected over one side of the receptacle 10. The burners 17 are disclosed in the drawing as being peculiarly adaptable for acetylene gas, as this gas when consumed emits an intense light and thereby furthers the operation and effectiveness of the trap. The member 15 is provided at its lower end and at its opposite sides with hooks 19 upon which any suitable luminous element may be hung in lieu of the burners 17.

In the operation of the trap the burners 17 are lighted and the rays of light therefrom are reflected outwardly from the member 15 and from all sides of the same. The curvature of the member 15 insures the reflection of the light from all sides of the trap. The light which is thus radiated from the trap is adapted to attract insects thereto which pass about and through the flame of the burners 17, when they burn their wings and fall into the receptacle 10, or strike suddenly against the downwardly sloped surface of the member 15 and are deflected into the receptacle 10. It will be thus observed that the member 15 serves a double function of not only reflecting the light from the burners 17 outwardly from the trap, but also serves to deflect the insects as they strike thereagainst.

The central burner 17 throws a beam of light upwardly through the deflector 15 to attract insects above the top.

Having thus described the invention what is claimed as new is:—

1. A trap including a receptacle, uprights positioned at the opposite sides of the receptacle, arms inwardly extending from the upper extremities of the uprights, fingers depending from the inner ends of the arms, an inverted frusto-conical member carried upon said fingers over said receptacle, and luminous elements arranged adjacent the opposite sides and at the lower end of said member.

2. A trap including a receptacle for insects, an inverted frusto-conical member arranged above the receptacle, said member having a highly polished outer surface, and luminous elements arranged over the receptacle and at the opposite sides of said member.

In testimony whereof I affix my signature in presence of two witnesses.

WILLIAM A. WALLACE. [L. S.]

Witnesses:
A. S. J. SHAW,
HARRY OLIPHANT.

Copies of this patent may be obtained for five cents each, by addressing the "Commissioner of Patents, Washington, D. C."